(12) United States Patent
Sugimoto et al.

(10) Patent No.: US 8,732,816 B2
(45) Date of Patent: May 20, 2014

(54) METHOD AND APPARATUS FOR EXCHANGING DATA BETWEEN A USER EQUIPMENT AND A CORE NETWORK VIA A SECURITY GATEWAY

(75) Inventors: Shinta Sugimoto, Kanagawa (JP); Ryoji Kato, Kanagawa (JP); Toshikane Oda, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 110 days.

(21) Appl. No.: 13/502,117

(22) PCT Filed: Oct. 27, 2009

(86) PCT No.: PCT/SE2009/051222
§ 371 (c)(1),
(2), (4) Date: Apr. 13, 2012

(87) PCT Pub. No.: WO2011/053201
PCT Pub. Date: May 5, 2011

(65) Prior Publication Data
US 2012/0204253 A1 Aug. 9, 2012

(51) Int. Cl.
*G06F 9/00* (2006.01)
*G06F 15/16* (2006.01)

(52) U.S. Cl.
USPC .......................................... 726/12; 380/277

(58) Field of Classification Search
USPC .................... 380/270, 277; 726/12
See application file for complete search history.

(56) References Cited

U.S. PATENT DOCUMENTS

| 7,779,152 B2 * | 8/2010 | Narayanan ..................... 709/238 |
| 8,457,635 B2 * | 6/2013 | Bachmann et al. .......... 455/436 |
| 2004/0148430 A1 | 7/2004 | Narayanan |

FOREIGN PATENT DOCUMENTS

| EP | 1638261 A1 * | 9/2004 | .......................... 7/38 |
| EP | 1638261 A1 | 3/2006 | |
| EP | 2166724 A1 | 3/2010 | |
| WO | 2009087099 A1 | 7/2009 | |

OTHER PUBLICATIONS

International Search Report and Written Opinion, Application No. PCT/SE2009/051222, dated Jul. 19, 2010, 13 pages.
Mghazli, El Y., et al., "MPA using IKEv2 and MOBIKE draft-yacine-preauth-ipsec-01", Network Working Group, Internet -Draft, Jun. 8, 2006, 17 pages.

* cited by examiner

*Primary Examiner* — Fikremariam A Yalew
(74) *Attorney, Agent, or Firm* — Blakely Sokoloff Taylor & Zafman LLP

(57) ABSTRACT

The present invention concern a methods and an apparatus for exchanging data between a user equipment and a core network via a security gateway. The invention concerns the establishment of an inactive pair of tunnel mode security associations between the UE and the security gateway, as well as the application of the pair of security associations when the UE detects attachment to or need to attach to an untrusted access network.

21 Claims, 8 Drawing Sheets

METHOD AND APPARATUS FOR EXCHANGING DATA BETWEEN A USER EQUIPMENT AND A CORE NETWORK VIA A SECURITY GATEWAY

CROSS-REFERENCE TO RELATED APPLICATIONS

This application is a National stage of International Application No. PCT/SE2009/051222, filed Oct. 27, 2009, which is hereby incorporated by reference.

TECHNICAL FIELD

The present invention relates to a method and apparatus for exchanging data between a user equipment, UE, and a core network via a security gateway.

BACKGROUND

Third Generation Partnership Project (3GPP) defines a mobile core network called the Evolved Packet Core (EPC) that allows mobile nodes (3GPP User Equipment (UE)) to attach to heterogeneous access networks including 3GPP accesses and non-3GPP accesses. The all IP-based network architecture makes convergence of the fixed and mobile networks possible.

There is no guarantee that the access network securely transfers user traffic to the EPC, when the mobile node attaches to an untrusted non-3GPP access network. Therefore, the mobile node establishes a pair of Security Associations (SAs) with a security gateway, called the evolved Packet Data Gateway (ePDG), inside the EPC. All user traffic is then tunneled through a secure bi-directional tunnel by applying the established Security Associations to the traffic. IP mobility management (IPMM) is done either in a network-based manner or in a client-based manner. In the former case, Proxy Mobile IPv6 (PMIPv6) is used and the ePDG serves as a Mobile Access Gateway (MAG). In the latter case, Dual Stack Mobile IPv6 (DSMIPv6) is used and the ePDG does not get involved in the IP mobility management at all.

The secure tunnel is commonly established by using Internet Protocol Security (IPsec), a protocol for securing IP communications by authenticating and encrypting IP packets. IPsec can be implemented in a host-to-host transport mode, as well as in a network tunnel mode. In transport mode, only the payload (data) of an IP packet is encrypted and/or authenticated. In tunnel mode, the entire IP packet (data and IP header) is encrypted and/or authenticated, and then encapsulated into a new IP packet with a new IP header.

A security association (SA) may be defined as a simplex connection between two entities that affords security services to the traffic carried by it. Security services are afforded to an SA by the use for example of either of the protocols Authenticating Header (AH) or Encapsulating Security Protocol (ESP). For a tunnel mode security association (SA) (a security tunnel) there is an "outer" IP header that specifies the IPsec processing source and destination, plus an "inner" IP header that specifies the (apparently) ultimate source and destination for the packet. The security protocol header appears after the outer IP header, and before the inner IP header. Depending on which protocol is being employed the outer IP header are afforded protection (in case AH is used) or not (in case ESP is used). The outer IP header source address and destination address (the outer IP address of the IPsec SA) identify the endpoints of the tunnel (the encapsulator and decapsulator). The inner IP header source address and destination addresses ((the outer IP address of the IPsec SA) identify the original sender and recipient of the data (from the perspective of this tunnel), respectively.

Extensible Authentication Protocol (EAP) is a mechanism for authentication and session key distribution using the Authentication and Key Agreement (AKA) mechanism. EAP-AKA protocol is developed by 3GPP. Authentication and authorization based on EAP-AKA is done during the attachment procedure of the mobile node to EPC through an untrusted non-3GPP access network. The mobile node and the ePDG run Internet Key Exchange version 2 (IKEv2) to establish an IPsec security association (SA). IKE is a component of IPsec used for performing mutual authentication and establishing and maintaining security associations (SAs). The mutual authentication is performed between the mobile node and the AAA server (an unit that provide IP functionality to support the functions of authentication, authorization and accounting) in the EPC, and the ePDG serves as a pass-through authenticator. In this way, IKEv2 is used as carrier of EAP messages. The ePDG assigns an inner IP address to the mobile node during the attachment procedure by using the configuration payload. When the IPMM is done in a network-based manner, an EPC IP address is assigned as an inner IP address for the mobile node. When the IPMM is done in a client-based manner, the ePDG assigns an IP address from its own IP address pool to the mobile node. Then the mobile node uses the inner IP address as a care-of address (CoA) in the DSMIPv6 context.

In 3GPP a mobile node needs to take a full authentication and authorization procedure when it attaches to an untrusted non-3GPP access network. The procedure requires a lengthy message exchange among the mobile node, a security gateway and an AAA server. The authentication and authorization procedure takes at least three round trip time (RTT) between the mobile node and the AAA server in the mobile core network. From a security perspective, there is no need for the mobile node and the mobile core network to perform full authentication and authorization procedure whenever it changes access, as far as there is evidence that the two have mutually authenticated to each other. It would therefore be desirable if the mobile node and the mobile core network could omit the full authentication and authorization procedure even when the mobile node performs an inter radio access technology (IRAT) handover.

The Internet draft "MPA using IKEv2 and MOBIKE draft-yacine-preauth-ipsec-01", discloses how a call can be transferred between first and second untrusted access networks and respective first and second secure gateways connected to a core network. When the user terminal, UE, residing in a first access network discovers a second gateway, belonging to a second access network to which it may attach, it starts an authentication procedure with this second gateway using IKEv2 while the UE is still attached to the first access network using an already established IPsec tunnel. The IKEv2 authentication procedure establishes an IPsec tunnel between UE and the second gateway. When handover to the second access network subsequently takes place, the source outer address of the IPsec tunnel is updated using the MOBIKE protocol and the new IPsec tunnel can be used without performing a complete reauthentication procedure.

A drawback with the prior art is that traffic may unnecessarily be sent via the newly established IPsec tunnel as soon as the IPsec tunnel is established, because the UE and/or security gateway cannot determine to which IPsec tunnel (the old or the new) the traffic is to be injected. A workaround for this problem would be to establish the IPsec tunnel as close as possible before the UE performs the handover. However, it may be difficult or even impossible to predict the time when the handover is to take place which may thus result in a too early establishment of the IPsec tunnel or a too late establishment of the same which would trigger the start of the full authentication and authorization procedure resulting in an inefficient handover.

There is thus a need for a secure and efficient solution that eases handover to an untrusted access network.

SUMMARY

An object of the present invention is therefore to provide a method of exchanging data between a User Equipment, UE, and a core network via a security gateway. The method comprises a plurality of steps to be performed by the UE. The UE establishes an inactive pair of tunnel mode security associations between the UE and the security gateway. The establishment step includes transmitting a key negotiation message to the security gateway where the key negotiation message includes information that the pair of security associations shall be in an inactive status, i.e. the pair of tunnel mode security associations will not be applied to user traffic. When the UE then detects attachment to or need to attach to an untrusted access network, the previously established but inactive pair of security associations will be applied to user traffic traversing the untrusted network, i.e. the pair of tunnel mode security associations will be active. The application step includes transmitting an information exchange message to the security gateway where the information exchange message includes information that the established but inactive pair of security associations shall be applied.

An advantage with this method is that handover to an untrusted access network is made simple avoiding a complete reauthentication procedure when attaching to the untrusted access network.

A further advantage is that the pair of security associations that are to be used for user traffic traversing the untrusted access network will be applied at the right time, i.e. when attachment to, or need to attach to, an untrusted access network is detected.

In a preferred embodiment of the invention the UE establishes at least two inactive pairs of tunnel mode security associations, wherein these pairs of security associations are established in respect of different untrusted access networks. When applying a security association pair, the security association pair associated with the untrusted network to which the UE has attached or needs to attach is chosen.

An advantage with this embodiment is that a plurality of pairs of security associations will be pre-established which makes it easy to perform handover even though it beforehand may be uncertain to which untrusted access network the UE may attach.

In another embodiment, the present invention is directed to a mobile UE. The UE comprises a communication interface configured to communicate with both trusted access networks and untrusted access networks. The UE further comprises an access selection unit configured to detect the attachment to or need to attach to an untrusted access network and a security unit. The security unit is configured to establish an inactive pair of tunnel mode security associations between the UE and a security gateway. This is accomplished by including information that the pair of security associations shall be in an inactive status in a key negotiation message to be sent to the security gateway. The security unit is also configured to apply said security association pair when the access selection unit detects the attachment to or need to attach to an untrusted access network. This is accomplished by including information that said established but inactive pair of security associations shall be applied in an information exchange message to be sent to the security gateway.

Advantages with such a UE is e.g. that handover to an untrusted access network is made simple avoiding a complete reauthentication procedure when attaching to the untrusted access network and that the pair of security associations that are to be used for user traffic traversing the untrusted access network will be applied at the right time, i.e. when attachment to, or need to attach to, an untrusted access network is detected.

In another embodiment, the present invention is directed to a method of exchanging data between a UE and a core network via a security gateway, comprising a plurality of steps to be performed by the security gateway. The security gateway establishes an inactive pair of tunnel mode security associations between the security gateway and the UE. The establishment includes receiving a key negotiation message from the UE, where the key negotiation message includes information that the pair of security associations shall be in an inactive status. The established but inactive pair of security associations is then applied to user traffic traversing the untrusted network, wherein the application includes receiving an information exchange message from the UE. The information exchange message includes information that the established but inactive pair of security associations shall be applied.

Advantages with such a method include that a complete reauthentication procedure can be avoided when a UE attaches to an untrusted access network and that the pair of security associations that are to be used for user traffic traversing the untrusted access network will be applied at the right time, i.e. when attachment to, or need to attach to, an untrusted access network is detected by the UE.

In yet another embodiment, the present invention is directed to a security gateway, e.g. an ePDG, used for interconnecting access networks to a core network. The security gateway comprises an interface configured to communicate with a user equipment, UE over an untrusted access network as well as with a core network. The security gateway further comprises a security unit configured to establish an inactive pair of tunnel mode security associations with a UE upon receipt of a key negotiation message from the UE. The key negotiation message includes information that the pair of security associations shall be in an inactive status. The security unit shall also be configured to apply the previously established but inactive security association pair upon receipt of an information exchange message from the UE. The information exchange message includes information that said established but inactive pair of security associations shall be applied.

Advantages with such a security gateway is e.g. that a complete reauthentication procedure can be avoided when a UE attaches to an untrusted access network and that the pair of security associations that are to be used for user traffic traversing the untrusted access network will be applied at the right time, i.e. when attachment to, or need to attach to, an untrusted access network is detected by the UE.

BRIEF DESCRIPTION OF THE DRAWINGS

Reference will now be made, by way of example, to the accompanying drawings, in which.

DETAILED DESCRIPTION

This section gives detailed description about an embodiment of the present invention. The 3GPP System Architecture Evolution (SAE) is taken as an exemplary target mobile network where the embodiment is applied. A mobile node is referred to as "3GPP User Equipment (UE)" or just "UE" and the mobile core network is referred to as "EPC". The security gateway is e.g. a firewall or an IPsec enabled router, and is referred to as "evolved Packet Data Gateway (ePDG)", and the security tunnel is e.g. implemented using a pair of "IPsec SAs".

Figure 1:
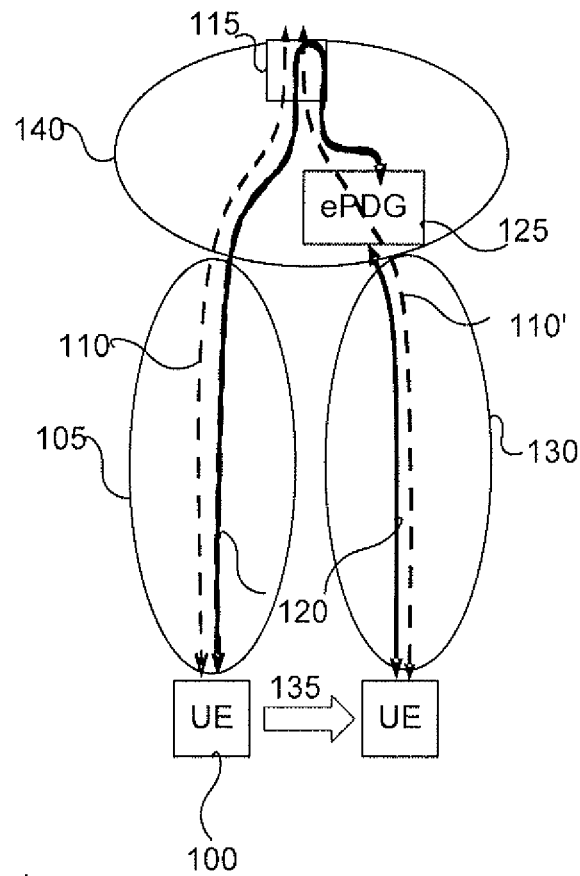
FIG. 1 schematically illustrates a system in which a UE is attached to a trusted and untrusted access network, respectively.

FIG. 1 schematically illustrates a system in which the present invention is embodied. In this embodiment, it is assumed that the UE 100 is equipped with a trusted access, i.e. a transceiver configured for communication with e.g. an LTE system, and an untrusted access, i.e. a transceiver configured for communication with e.g. a wireless LAN such as WiFi and/or WiMax. The UE is preferably configured to activate either or both of the accesses according to requirements from applications in the UE.

In this embodiment, the UE 100 is initially attached to a trusted access network 105, such as 3GPP, where the data traffic flows 110 between the UE and a Packet Data Network Gateway (PDN-GW) 115 residing in the EPC 140. While the UE is still attached to the 3GPP network 105, a pair of IPsec Security Associations (SAs) 120 are established between the UE and a secure gateway (ePDG) for facilitating the establishment of a tunnel mode IPsec SA 120. The established IPsec SAs 120 are inactivated at the establishment stage meaning that it will not be applied and will not be handling user traffic while the UE gets PDN connectivity from the 3GPP access network 105, but the traffic will be continued as before the establishment, via traffic flow 110. When the UE 100 then performs a handover 135 from the trusted 3GPP access network 105 to an untrusted non-3GPP access network 130, the IPsec SAs 120 will be activated. Once the IPsec SAs 120 are applied and in an active status, the traffic flow 110' will be tunneled between the UE and the ePDG by the IPsec SAs 120.

Figure 2:
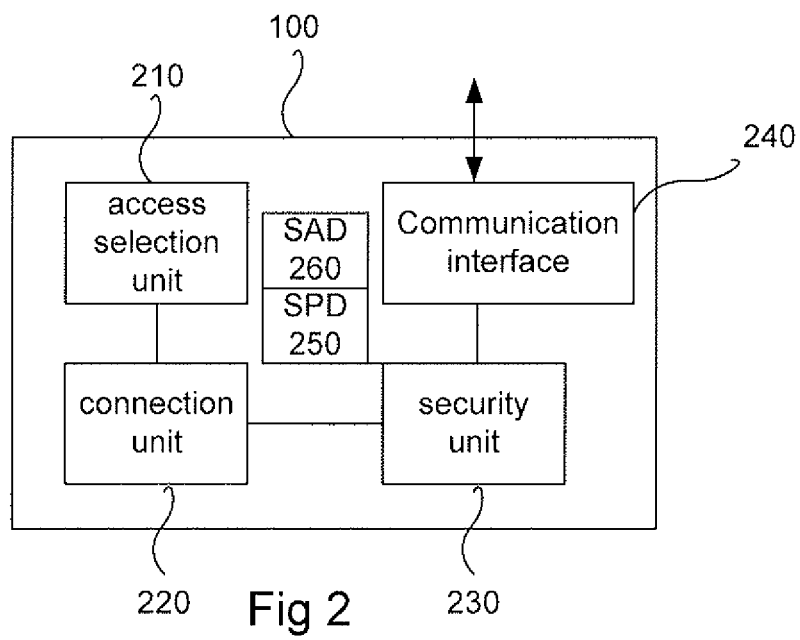
FIG. 2 schematically illustrates a UE according to an embodiment of the invention.

FIG. 2 schematically illustrates a UE 100 according to an embodiment of the invention. The UE comprises a connection unit 220 (also referred to as connection manager), the connection unit being responsible for deciding whether to activate the IPsec SAs or not. The connection manager 220 interacts with an access selection unit 210 (also referred to as access selection manager) and a security unit 230, both being included in the UE. The access selection manager 210 being responsible for monitoring availability of access networks for the UE and may include an Access Network Service Discovery Function (ANDSF) client. The access selection unit 210 informs the connection manager of the availability of a given access. The security unit 230 is preferably responsible for initiating key negotiation with a security gateway and for activation/deactivation of security associations. The security unit 230 should be able to handle the signaling messages; pre-establish SAs, activate SAs and deactivate SAs signalled from the connection unit 220. The security unit 230 on the UE should be able to handle key negotiation messages, such as IKEv2 INFORMATIONAL exchange messages that convey the commands to activate IPsec SAs or deactivate IPsec SAs. The security unit 230 should also be able to maintain IPsec SAs in an inactive status.

The connection unit 220 signals the security unit 230 when necessary. The signal may e.g. be either 1) pre-establishment of the IPsec SAs, or 2) activation of the IPsec SAs, or 3) deactivation of the IPsec SAs. The connection unit thus triggers the initial establishment of a pair of IPsec SAs as well as a change in status of the IPsec SAs. Among other further units, the UE 100 also comprises a communication interface 240 for communicating with other communication nodes. The communication interface 240 comprises preferably a transceiver configured for communication with 3GPP accesses and a transceiver configured for communication with non-3GPP accesses. The UE 100 may also comprise a security policy database (SPD) 250 and a security association database (SAD) 260. The security policy database 250 may store a plurality of security policies which indicate required treatment of IP flows, e.g., whether an IP flow shall be ciphered or not. The security association database 260 may store a plurality of security associations which include endpoints of security association and cryptographic materials (e.g., ciphering keys) required for IPsec packet processing. According to embodiments of the present invention the UE 100 is able to maintain the status of a security association, whether it is in an active or inactive status, in security policy database 250 and/or security association database 260.

Although FIG. 2 shows exemplary components of UE 100, in other implementations, UE 100 may contain fewer, different, or additional components than depicted in FIG. 2. In still other implementations, one or more components of UE 100 may perform the tasks described as being performed by one or more other components of UE 100. E.g. the UE 100 may, even though not shown in the figure, further comprise processing logic that may control operation of UE 100 and its components, including a processor, microprocessor, an application specific integrated circuit (ASIC), field programmable gate array (FPGA), or the like. The UE 100 may e.g. further include memory such a random access memory (RAM), a read only memory (ROM), and/or another type of memory to store data and instructions that may be used by processing logic; input device(s) including mechanisms for entry of data into UE 100; output device(s) including mechanisms for outputting data in audio, video and/or hard copy format; and a bus that may interconnect the various components of UE 100 to permit the components to communicate with one another.

A procedure for pre-establishing a pair of security associations according to an embodiment of the invention will now be illustrated with reference to FIG. 3. In step 310, a 3GPP UE 100 is attached to a trusted 3GPP access (note that the procedure also is applicable if the UE is attached to an untrusted access network instead) and the connection unit 220 decides to pre-establish a pair of security associations preparing for the future setup of PDN connectivity over an untrusted non-3GPP access network. Pre-establishment of the security associations can be triggered by using miscellaneous context information about the UE or the user of the UE. For instance, pre-establishment may be triggered when the UE gets inside a specific geographical location such as his/her residence. In this way, the mobile core network and the UE can minimize the overhead of the proposed solution in terms of signalling cost and memory consumption.

The IP address of the ePDG can either be statically configured or dynamically selected by the connection unit 220. If the address of the ePDG 125 is dynamically determined, the access selection manager 210 provides information about the selected ePDG to the connection manager 220 in step 315. In step 320 the connection manager signals the security unit 230 to initiate a key negotiation to pre-establish the security associations. The key negotiation is preferably an IKE key negotiation performed in accordance with RFC 4306 for automated key management, but other automated key distribution techniques may be used, and the security associations are preferably IPsec SAs.

In step 325 the security unit initiates key negotiation, preferably an IKE key negotiation, towards the ePDG to create an IPsec SA pair for protecting user traffic. The IKE signaling messages are preferably transmitted over the 3GPP access and include information that the IPsec SA pair shall be in an inactive status. When the tunnel mode IPsec SAs, preferably using Encapsulating Security Payload (ESP) as protocol, are successfully established, the security units 230, 305 inactivates the IPsec tunnel in step 330. The ePDG assigns an inner IP address for the 3GPP UE which is identical to the EPC IP address assigned to the 3GPP access. An inactive status for the IPsec SAs means that a valid IPsec SA pair exists between the peers (UE and ePDG), but is not in use. An example of how to achieve the inactive status is to configure a security policy database (SPD) in a way that no IP traffic is matched with the SPD entry that is bound to the IPsec SAs. The IPsec SAs and the assigned inner IP address are not in use when they are in an inactive status. In step 335, the security unit 230 reports the result of the pre-establishment of the requested IPsec SA by sending a "Pre-establish SA response" message to the connection unit 220.

In step 340, the 3GPP UE attaches to an untrusted non-3GPP access network, e.g. a wireless LAN, or detects a need to attach to an untrusted non-3GPP access network. Access authentication and IP address configuration is done, and the 3GPP UE becomes ready to send or receive IP packets by the WLAN interface. In step 345, the access selection unit 210 (e.g., an ANDSF client) signals the connection unit 220 telling that a new access (an untrusted non-3GPP access) becomes available. In step 350, the connection unit 220 decides to activate an IPsec tunnel and signals the security unit 230 instructing it to activate the IPsec SAs and update the tunnel endpoints of the IPsec tunnel. In step 355, the security unit 230 sends an IKEv2 INFORMATIONAL exchange message to update the tunnel endpoint. The endpoint on the 3GPP UE side is updated from the IP address assigned by the EPC to an IP address assigned by the untrusted access network. This address update is preferably in accordance with RFC4555-IKEv2 Mobility and Multihoming Protocol (MOBIKE). In step 360, when the IPsec tunnel endpoint is updated, the security unit 230 in the UE 100 and the security unit 305 in the ePDG 125 changes the status of the IPsec SAs from inactive to active, meaning that the IPsec SAs will be applied to user traffic traversing the untrusted access network. In step 365, the security unit 230 reports the result of the activation procedure by sending an "Activate SA response" message to the connection unit 220. In step 370, the connection unit 220 sends a response to the access selection manager informing the result of the IPsec SA activation.

A procedure for pre-establishing and activating a security association according to an embodiment of the invention will now be illustrated with reference to the block diagram in FIG. 4. Reference will also be made to FIG. 3. In block 410 the UE 100 is attached to an LTE access network. The UE is equipped with LTE and WLAN interfaces 240. In step 420 the UE detects an access network in which it is decided to pre-establish a pair of security associations for future use. The mobile operator may estimate target access network to which the UE is going to attach based on e.g. 1) geographical location of the UE, e.g. determined by Global Positioning System (GPS) receivers and/or 2) radio coverage information, such as L2 connectivity information (e.g., receipt of beacons from Wireless LAN access points). If no ePDG is directly suitable for the pre-establishment of the security tunnel, i.e. the endpoint of the tunnel, the mobile operator may select a default ePDG. The results of candidate ePDG discovery conducted by the operator are transferred to the access selection unit 210 and then further transferred to the connection unit 220 (step 315 in FIG. 3). Note that the candidate ePDG discovery may result in a plurality of ePDGs, i.e., the result may contain more than one IP address of an ePDG.

Figure 3:
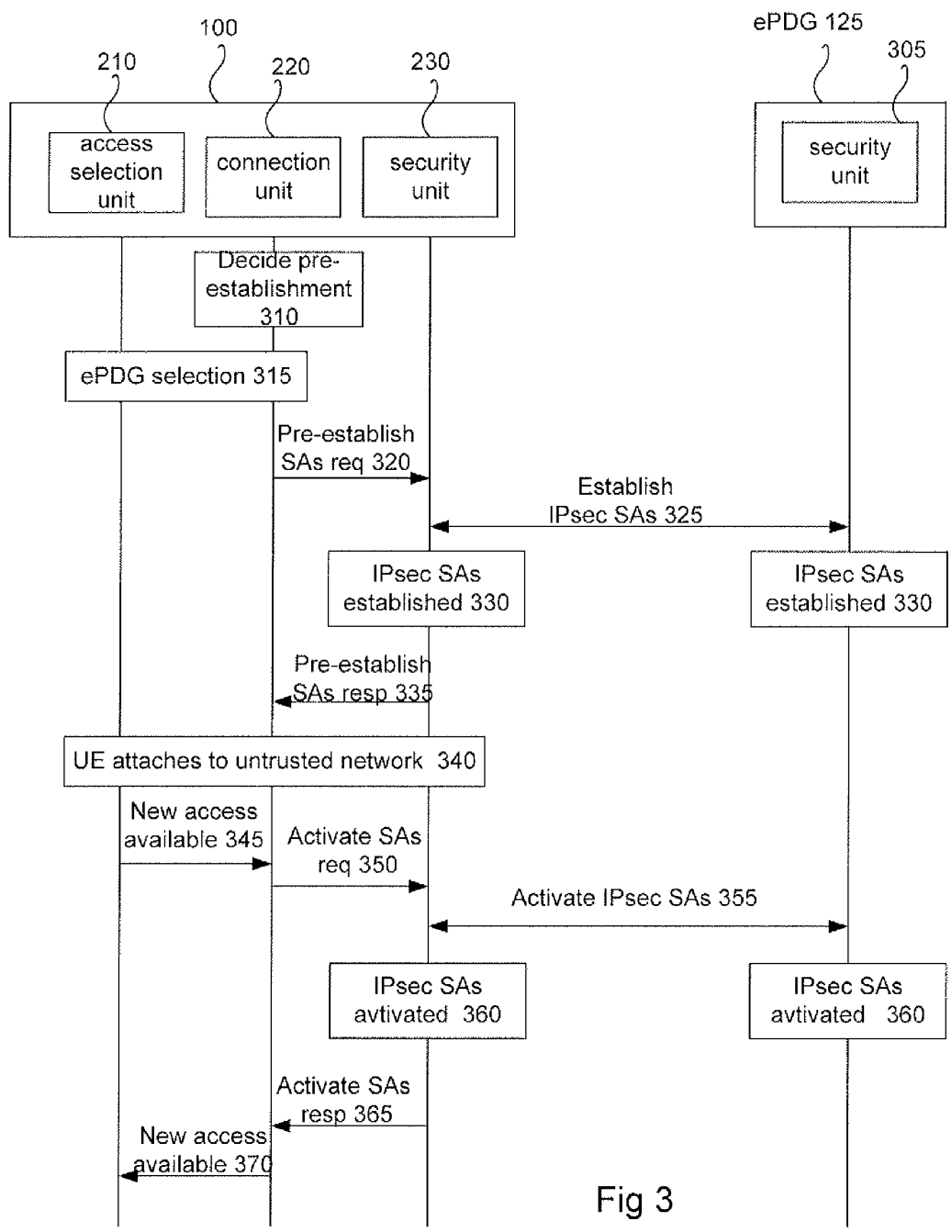
FIG. 3 is a signal diagram illustrating the procedure of pre-establishing a security association according to an embodiment of the invention.
Figure 4:
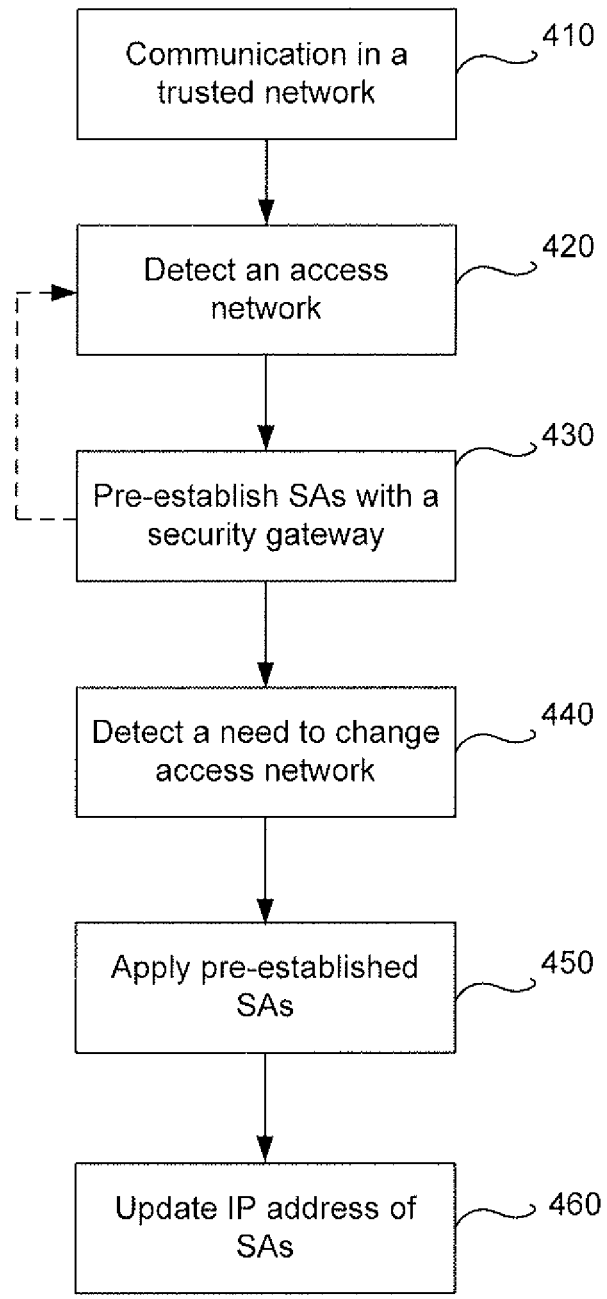
FIG. 4 is a block diagram illustrating the procedure of pre-establishing a security association according to an embodiment of the invention.

When the connection unit 220 in the UE makes a decision to pre-establish an IPsec tunnel, it sends a "Pre-establish SA" signaling message to the security unit 230 requesting to initiate an IKE negotiation (step 320 in FIG. 3). The signaling message 320 may contain the following information.

Traffic selector information
ePDG IP address

The traffic selector information tells which IP flows that shall be transmitted by the IPsec tunnel. A set of traffic selector information consists of IP protocol, start port, end port, start address, and end address, and it may be defined for both client (i.e., UE) and server (i.e., security gateway) sides. This information is exchanged between the IKE peers during the IKE negotiation (step 325 in FIG. 3), which may be called the traffic selector negotiation. Besides the traffic selector information, the "Pre-establish SA" signaling message (step 320 in FIG. 3) may contain the ePDG IP address. The mobile operator preferably manages a database which maintains mappings between access networks and suitable ePDGs.

When the security unit 230 receives the "Pre-establish SA" signaling message, it starts an IKE key negotiation to establish, see block 430, a tunnel mode IPsec SA pair with the security gateway (step 325 FIG. 3). The procedure is the same as a standard IKE key negotiation except that the initiator (UE) indicates that the IPsec SA is to be pre-established and hence in an inactive status. A preferred way to implement this indication is to define a new flag in the SA Payload Header to distinguish pre-establishment from normal operation. The flag is preferably carried in an IKE CREATE_CHILD_SA message. Thus, the status of the tunnel mode IPsec SA is set in an inactive status by setting a flag in a key negotiation message during the pre-establishment (step 430) of the tunnel mode IPsec SAs. Authentication and authorization is preferably embedded in the IKE key negotiation according to 3GPP TS 33.402. IP address allocation is also done during the IKE negotiation. This means that the ePDG determines the type of IPMM (so-called the "IP mobility mode selection" in 3GPP TS 33.402) and allocates a suitable inner IP address for the 3GPP UE. When the IPMM is done in a network-based manner, the inner IP address would preferably be chosen from an IP address pool of a PDN-GW. When the IPMM is done in a client-based manner, the inner IP address would preferably be chosen from an IP address pool of the ePDG itself. When the connection is established by the IKE key negotiation, the security unit 230 sets the IPsec SA in an inactive status (step 330 in FIG. 3). After the pre-establishment of the IPsec SAs the security unit sends a "Pre-establish SA response" signaling message to the connection manager (step 335 in FIG. 3). The response message contains the following information.

Status code (success/fail)
Traffic selector information

The status code indicates whether the pre-establishment of SA is successful or not. If not, the cause of the error shall be indicated. The traffic selector information is the result of traffic selector negotiation conducted between the IKE peers. Note that the traffic selector information may or may not be the same as the one which has been carried in the Pre-establish SA request message (step 320). The connection unit 220 stores this information and uses it to specify the security policy corresponding to the tunnel mode IPsec SAs.

When a UE establishes an active IPsec SA pair (tunnel mode) with an ePDG, the security policy database (SPD) may be configured as below. Note that SP2 and SP4 are default entries and the SP entries are in descending order of priority:

Outer security policy (SP) entry:
SP1 (selector: <src-ip-addr: home address, dst-ip-addr: any, src-port: any, dst-port: any, proto: any>)-(requires)→SA1 (IPsec tunnel)
SP2 (default) (selector: <src-ip-addr: any, dst-ip-addr: any, src-port: any, dst-port: any, proto: any>)-(requires)→no IPsec
Inner security policy (SP) entry:
SP3 (selector: <src-ip-addr: home address, dst-ip-addr: any, src-port: any, dst-port: any, proto: any>)-(requires)→SA2 (IPsec tunnel)
SP4 (default) (selector: <src-ip-addr: any, dst-ip-addr: ay, src-port: any, dst-port: any, proto: any>)-(requires)→no IPsec For outbound (uplink) traffic, all the user traffic will be handled by the IPsec tunnel (SA1) because any outbound IP traffic (whose source address is the home address) will match with SP1. Unless a mechanism for activating and inactivating an IPsec SA is defined, the UE according to the configuration above will start to send all user traffic to the IPsec tunnel (SA1) after establishment of an IPsec SA, which would be undesirable. Therefore, when an IPsec SA is in status inactive, the system works as if the IPsec SA does not exist. This is accomplished by configuring the SP entry (SP1 for outbound, and SP3 for inbound (downlink), according to the configuration above) in a special manner. This is preferably accomplished by configuring these SP entries in a way that no IP traffic will match with them. In this way, the system (both on the UE and the ePDG) can set a given pair of IPsec SAs in an inactive status. In order to activate the IPsec SAs, the system can restore the SP entries as described above. It should be noted that this is preferably accomplished by a negotiation to be conducted by the UE and the ePDG, i.e. a new flag indicating the status of the IPsec SA (active or inactive) to be carried in key negotiation messages 325 and information exchange messages 355. It should be noted that the steps 420-430 can be iterated a plurality of times for a plurality of different access networks as indicated by the dashed line between block 430 and block 420. Thereby a plurality of different inactive security tunnels may coexist.

In step 440 the UE detects a need to change connection and attach to an untrusted access network. For instance, an application in the UE may prompt the user to activate the wireless LAN interface when the application is launched and to set up a PDN connectivity over the WLAN interface and hence attach to the untrusted non-3GPP access network. The connection unit 220 then takes a decision to apply (step 450) a previously established, but inactive, pair of tunnel mode IPsec SAs, and sends an "activate SA request" signaling message to the security unit 230 (step 350 in FIG. 3). The "activate SA request" signaling message may contain the following information.

Traffic selector information
Local tunnel endpoint address

The traffic selector information is used by the security unit 230 to specify the target security policy entry and the associated IPsec SAs. The connection unit 220 preferably stores the traffic selector information when it receives the "Pre-establish SA response" signaling message (335 in FIG. 3) from the security unit. The local tunnel endpoint address is the IP address assigned to the UE in the visited untrusted non-3GPP access network. The IP address has to be used as the outer tunnel address of the IPsec tunnel. When the security unit 230 receives the "Activate SA request" signaling message (step 350 in FIG. 3), it searches the security policy entry that matches with the traffic selector information included in the message. After the target security policy entry is located, the security unit 230 extracts the tunnel endpoint address from the message and updates the security policy entry and associated security association. Then the security unit 230 sends an IKEv2 INFORMATIONAL exchange message to the peer (i.e. the security unit 305 running on the security gateway 125) requesting to update the tunnel endpoint address (step 355 in FIG. 3 and step 460 in FIG. 4). The address update procedure is preferably done in accordance with MOBIKE and concludes the activation of the connection. The IKEv2 INFORMATIONAL exchange message 355 may convey the following information.

New tunnel endpoint address
An indication of activation

The new tunnel endpoint address is set as the source IP address of the IKEv2 INFORMATIONAL request message. After the address update procedure is done, the security unit sends an "Activate SA response" signaling message (step 365 in FIG. 3) to the connection unit.

Figure 5:
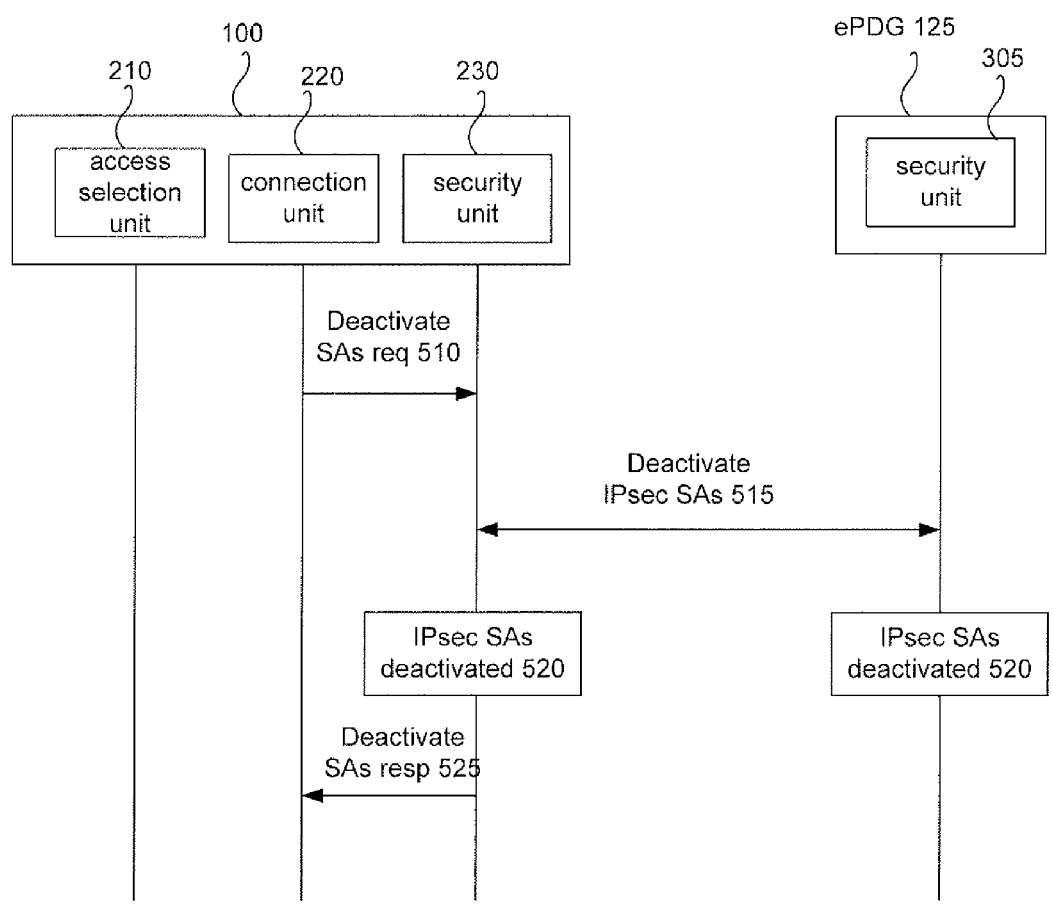
FIG. 5 is a signal diagram illustrating the procedure of deactivating a security association according to an embodiment of the invention.

A procedure of deactivating a pair of security associations according to an embodiment of the invention will now be described with reference to FIG. 5. When it becomes necessary for the UE to be detached from the untrusted non-3GPP access network, it needs to deactivate/inactivate the tunnel mode IPsec SA established with the ePDG. The connection unit 220 thus sends a "Deactivate SA request" message 510 to the security unit 230. The message may contain the following information.

Traffic selector information
Local endpoint address

As can be seen, a "Deactivate SA request" signaling message 510 may contain the same information as in an "Activate SA request" signaling message, differing only in whether the message includes information aimed for activation or deactivation of a pair of SAs.

When the security unit 230 receives the "Deactivate SA request" message, it searches the security policy entry, in database 250, which matches with the traffic selector information included in the message. After the target security policy entry is located, the security unit 230 extracts the tunnel endpoint address from the message and updates the security policy entry and associated security association. The new tunnel endpoint address should be the IP address that the UE gets assigned from the 3GPP access network. After updating of the tunnel endpoint address in the database 250 residing in the UE is done, the security unit 230 proceeds with an IKEv2 INFORMATIONAL exchange to request the ePDG

125 to correspondingly update the outer IP address of the pair of tunnel mode IPsec SAs in the ePDG in step 515. After the IKEv2 INFORMATIONAL exchange has been performed, the pair of IPsec SAs turns into an inactive status in step 520. Finally, the security unit 230 sends a "Deactivate SA response" message 525 to the connection unit.

Figure 6:
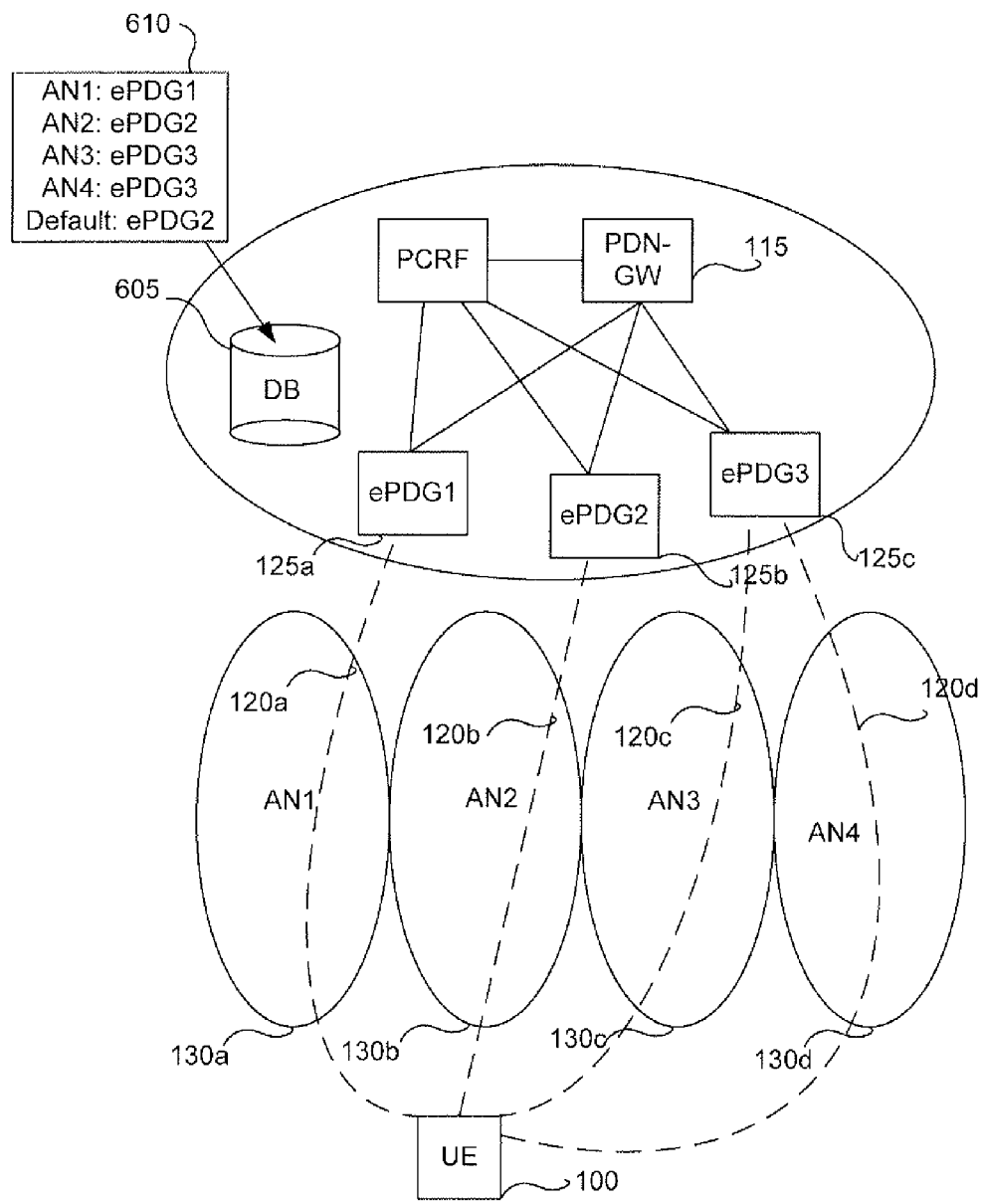
FIG. 6 schematically illustrates a system comprising a plurality of candidate untrusted access networks.

Embodiments of the present invention can support the establishment of IPsec SAs with a plurality of ePDGs. This is advantageous when the target access network for the UE is uncertain for the mobile operator, i.e. it is uncertain to which untrusted access network the UE may attach. FIG. 6 schematically illustrates a system comprising a plurality of candidate untrusted access networks AN1, AN2, AN3 and AN4 130*a-d*, in which discovery of candidate ePDGs result in three ePDGs, ePDG1 125*a*, ePDG2 125*b* and ePDG3 125*c*. In this example, it is assumed that the mobile operator is uncertain about to which target access network the UE will attach, and therefore the result of a candidate ePDG discovery includes ePDG1, ePDG2 and ePDG3. That is, three security gateways 125*a-c* are detected during the candidate discovery in accordance with block 420 in FIG. 4 and the UE and the three ePDGs are allowed to pre-establish IPsec SAs 120*a-d*, in accordance with block 430. As can be seen from the figure two security tunnels 120*c* and 120*d* are established and inactivated towards the ePDG3 125*c* over the access networks AN3 130*c* and AN4 130*d*, respectively. It should however be noted that the UE does not have to establish IPsec SAs with all the ePDGs in the network. It should also be noted that the present invention is also applicable to roaming scenarios when the security gateways are located in visited networks.

When the UE attaches to an untrusted non-3GPP access network 130*a-d*, the network operator or the UE shall choose one ePDG from the set of candidate ePDGs 125*a-c*. This choice is either made by the mobile operator or by the UE. If the selection is made by the network operator, the UE may send an IKEv2 INFORMATIONAL request message to all candidate ePDGs upon the attachment to the untrusted non-3GPP access network. The ePDG which is selected by the mobile operator would send an IKEv2 INFORMATIONAL response message with an indication that the ePDG has been selected by the mobile operator. Accordingly, the IPsec SAs are activated on the ePDG and the UE. In contrast, if the UE makes the selection of ePDG, it sends an IKEv2 INFORMATIONAL request message indicating that the ePDG has been selected.

In a database, DB, 605 the result of the ePDG discovery is kept in a table 610. As can be seen from the table, if the UE attaches to AN1, ePDG1 is chosen as the tunnel endpoint; if the UE attaches to AN2, ePDG2 is chosen; if AN3 is attached to, ePDG3 is chosen and if attachment is made to AN4, ePDG3 is chosen. In case none of the present ePDGs 125*a-c* is more suitable than the others, i.e. the endpoint of the tunnel, the mobile operator may select a default ePDG.

Figure 7:
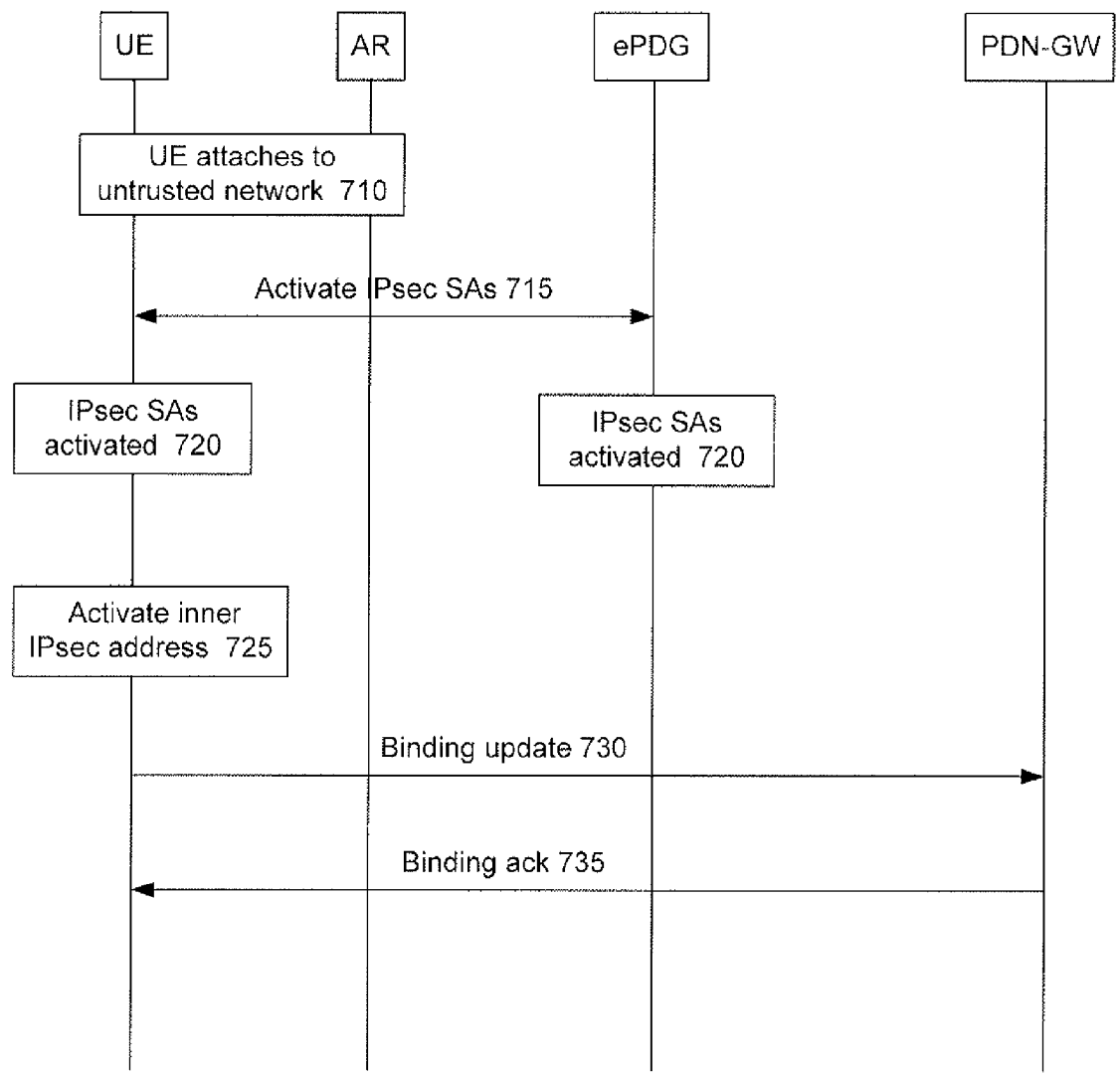
FIG. 7 is a signal diagram illustrating the procedure of activating an IPsec SA according to the present invention when the IP mobility management is performed in a client-based manner.

FIG. 7 is a signal diagram illustrating the procedure of activating an IPsec SA pair in 3GPP SAE (S2c) when the IP mobility management is performed in a client-based manner, by e.g. DSMIPv6. In step 710 the UE attaches to an untrusted access network and becomes able to send and receive IP packets. The attachment is achieved by performing an access authentication and an IP address configuration. The specific procedure for the access authentication depends on the access network. The UE obtains an IP address from the visited untrusted access network for the IP address configuration. An IP address can e.g. be assigned by using Dynamic Host Configuration Protocol (DHCP). The UE uses the assigned IP address to send or receive IP packets from the untrusted access network. In step 715 the connection unit on the UE decides to activate the tunnel mode IPsec SAs, and initiates an IKEv2 INFORMATIONAL exchange with the ePDG to which the tunnel mode IPsec SAs are to be activated. The IKEv2 message contains new tunnel endpoint address and an activation indication. Note that the step 715 preferably includes the sending of an IKEv2 INFORMATIONAL message response from the ePDG to the UE and that this sending could take place after step 720. In step 720 the UE and the ePDG update the tunnel endpoint address and activate the tunnel mode IPsec SAs. Note that the ePDG knows that there is no need to provide network-based IPMM for the UE. In step 725 the UE activates the IPsec inner address. In step 730 the UE sends a Binding Update (BU) message to the PDN-GW, the PDN-GW being a DSMIPv6 home agent and in step 735 the PDN-GW sends back a Binding Acknowledgement (BA) message to the UE.

Figure 8:
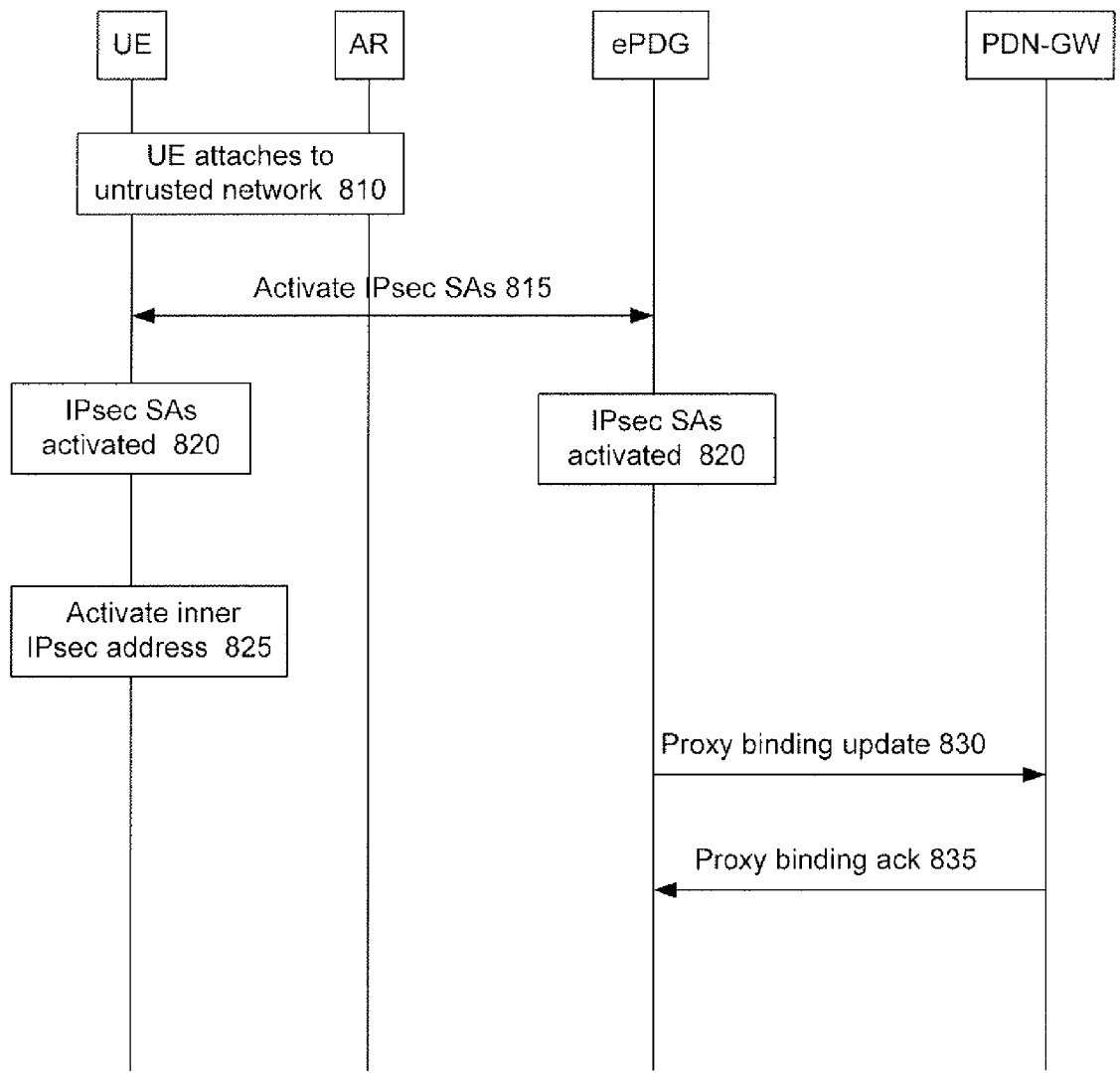
FIG. 8 is a signal diagram illustrating the procedure of activating an IPsec SA according to the present invention when the IP mobility management is performed in a network-based manner.

FIG. 8 is a signal diagram illustrating the procedure of activating an IPsec SA in 3GPP SAE (S2b) when the IP mobility management is performed in a network-based manner, by e.g. PMIPv6. The information about the PDN-GW is provided to the ePDG as part of the access authentication. The PDN-GW information is provided by the UE to the ePDG over the IKEv2 signaling messages. Steps 810-825 correspond to the steps 710-725 previously described with reference to FIG. 7. In step 830, the ePDG sends a Proxy Binding Update (PBU) message to the PDN-GW. Note that the ePDG knows that it needs to provide network-based IPMM for the UE because the IP mobility mode selection is done during the pre-establishment of the IPsec SA. In step 835, the PDN-GW processes the PBU message and sends back a Proxy Binding Acknowledgement (PBA) message to the ePDG. In a PMIPv6 scenario the ePDG is a Mobile Access Gateway (MAG).

Figure 9:
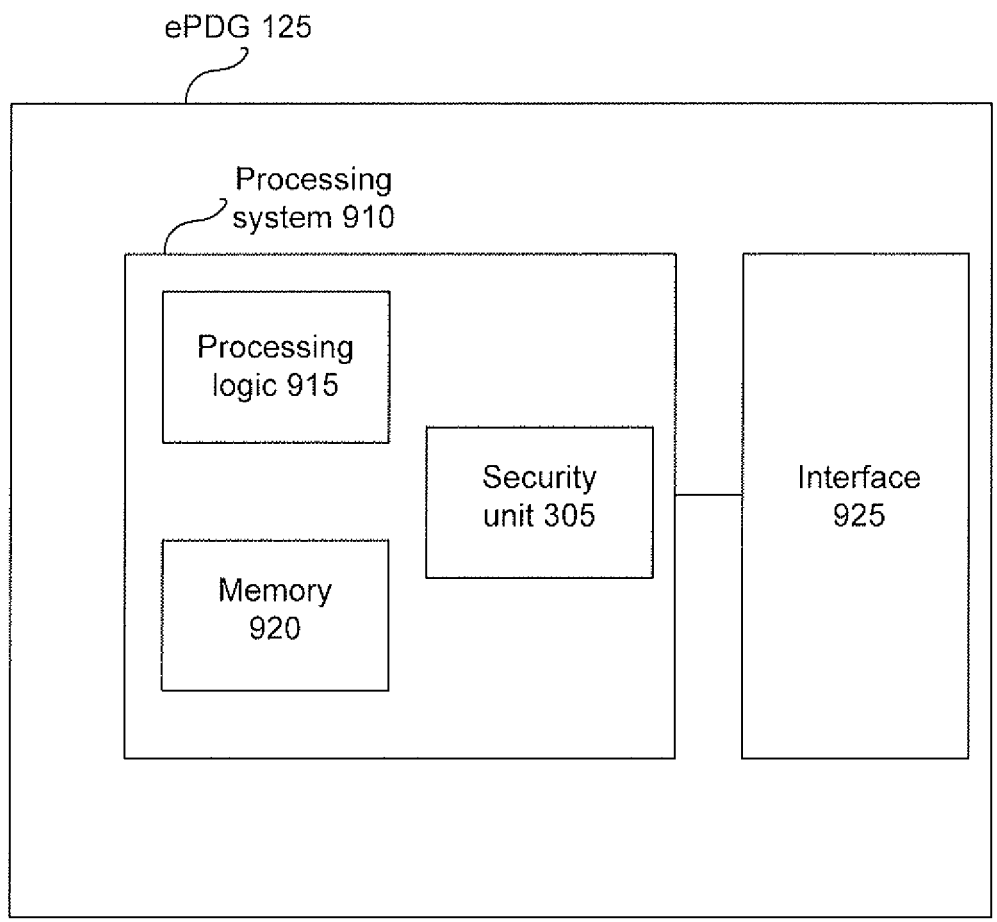
FIG. 9 schematically illustrates a security gateway according to an embodiment of the invention.

FIG. 9 is a diagram of exemplary components of an ePDG 125. As illustrated, ePDG 125 may include a processing system 910 and an interface 925.

Processing system 910 may control the operation of the ePDG 125. Processing system 910 may also process information received via interface 925. As illustrated, processing system 910 may include processing logic 915, a memory 920 and a security unit 305. It will be appreciated that processing system 910 may include additional and/or different components than illustrated in FIG. 9.

Processing logic 915 may include a processor, microprocessor, an ASIC, FPGA, or the like. Processing logic 915 may process information received via interface 925. In addition, processing logic 915 may generate control messages and/or data messages and cause those control messages and/or data messages to be transmitted via interface 925. Processing logic 915 may also process control messages and/or data messages received from interface 925. Memory 920 may include a RAM, a ROM, and/or another type of memory to store data and instructions that may be used by processing logic 915.

The security unit 305 is preferably responsible for performing key negotiation with a UE and for activation/deactivation of security associations. The security unit 305 should be able to handle signaling messages that include indications; to pre-establish SAs, to activate SAs and to deactivate SAs being sent from the UE 100. The security unit 305 on the ePDG should be able to handle key negotiation messages, such as IKEv2 INFORMATIONAL exchange messages that convey the commands to activate IPsec SAs or deactivate IPsec SAs. The security unit 305 should preferably also be able to maintain IPsec SAs in an inactive status.

Interface 925 may include one or more line cards that allow ePDG 125 to transmit data to and receive data from other devices over wired and/or wireless connections. Interface 925 may include at least functionality for communicating with user equipments over untrusted access networks and with core network entities, such as PDN-GW.

ePDG 125 may perform certain operations in response to processing logic 915 executing software instructions contained in a computer-readable medium, such as memory 920. The software instructions may be read into memory 920 from another computer-readable medium or from another device via interface 925. The software instructions contained in memory 920 may cause processing logic 915 to perform processes described herein. Alternatively, hardwired circuitry may be used in place of or in combination with software instructions to implement processes described herein. Thus, embodiments described herein are not limited to any specific combination of hardware circuitry and software.

Although FIG. 9 shows exemplary components of ePDG 125, in other implementations, ePDG 125 may contain fewer, different, or additional components than depicted in FIG. 9. In still other implementations, one or more components of ePDG 125 may perform the tasks described as being performed by one or more other components of ePDG 125.

Embodiments of the present invention may enable the UE to quickly setup PDN connectivity through an untrusted access network. The gain is achieved by omitting the full authentication and authorization procedure required for untrusted access networks. The quickness in the setup of PDN connectivity through an untrusted access network leads to user benefit even if the trusted access network provides permanent connectivity, because an application may urge a user to use an untrusted access network in some cases. For instance, an application may prompt the user to activate the wireless LAN interface when it is launched. In such a case, the user needs to wait until completion of wireless LAN interface activation followed by the IP address configuration. Hence it is valuable to minimize the setup time of PDN connectivity in the untrusted access network.

In some embodiments of the invention the method of exchanging data between a UE and a core network via a security gateway may comprise a number of steps to be performed by the UE, as follows. A key negotiation message for establishing a pair of tunnel mode security associations is transmitted towards the security gateway. The key negotiation message includes information that the pair of SAs will not be applied and thus be in an inactive status. This information may be included in the key negotiation message by the setting of a flag marking the pair of SAs as inactive. The pair of tunnel mode SAs will thus be established in respect of an untrusted access network, but will not be used unless a decision to apply/activate is made. This procedure may be performed in respect of a plurality of different untrusted access networks so that a plurality of different non-applied/inactive tunnel mode SAs may be established between the UE and security gateway(s). When attachment to or need to attach to an untrusted access network is detected by the UE, the UE transmits a message to the security gateway. The message preferably being an information exchange message including information that a previously established but not-applied/inactive pair of SAs shall be applied and thus be in an active status so that user traffic traversing the untrusted network will be transmitted using the applied pair of SAs.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method in a User Equipment (UE) for exchanging data between the UE and a core network via a security gateway, the method comprising:
    establishing an inactive pair of tunnel mode security associations between the UE and said security gateway for an untrusted access network, wherein said establishing includes a transmission to said security gateway of a key negotiation message indicating that the pair of security associations is to be in an inactive status;
    establishing a different inactive pair of tunnel mode security associations for a different untrusted access network;
    detecting an attachment to or a need to attach to the untrusted access network;
    determining that the security association pair associated with the untrusted access network is to be applied based upon the detecting of the attachment or the need to attach to the untrusted access network; and
    applying said established inactive pair of security associations to user traffic traversing the untrusted access network, wherein said applying includes a transmission of an information exchange message to said security gateway indicating that said established inactive pair of security associations is to be applied.

2. The method of claim 1, further comprising, upon the detecting of the attachment or the need to attach to the untrusted access network:
    sending an information request message to a plurality of security gateways; and
    receiving an information response message from the security gateway, wherein the security gateway was chosen by a network operator as the endpoint of the security association.

3. The method of claim 1, further comprising selecting said security gateway from a plurality of available security gateways.

4. The method of claim 1, wherein said applying the pair of tunnel mode security associations further comprises updating an outer Internet Protocol (IP) address of said security association pair with an IP address allocated to the UE by the untrusted access network.

5. The method of claim 1, wherein the key negotiation message includes a flag defining the status of the pair of security associations as inactive.

6. The method of claim 1, wherein the information exchange message includes a flag defining the status of the pair of security associations as active.

7. The method of claim 1, wherein the pair of security associations is set in an active status or the inactive status by configuring one or more security databases.

8. The method of claim 1, wherein the establishing the pair of tunnel mode security associations is triggered by a geographical location of the UE or L2 connectivity information.

9. The method of claim 1, wherein the pair of security associations are established over a trusted access network and are kept in the inactive status while the UE remains attached to the trusted access network.

10. The method of claim 1, further comprising:
    detecting a detachment from, or a need to detach from, the untrusted access network; and
    deactivating the pair of security associations that is applied to the user traffic in said untrusted access network, the deactivation including a transmission of another information exchange message to said security gateway, the another information exchange message indicating that said applied pair of security associations is to be changed to the in an inactive status.

11. The method of claim 1, further comprising sending a binding update message to a Packet Data Network Gateway (PDN-GW), the PDN-GW being a Dual Stack Mobile IPv6 home agent.

12. A mobile User Equipment (UE) comprising:
a communication interface configured to communicate with both trusted access networks and untrusted access networks;
an access selection unit configured to detect an attachment to or a need to attach to an untrusted access network; and
a security unit configured to:
establish an inactive pair of tunnel mode security associations between the UE and a security gateway for an untrusted access network, wherein the establishment is to include a transmission of a key negotiation message to the security gateway, wherein the key negotiation message indicates that the pair of security associations is to be in an inactive status,
establish a different inactive pair of tunnel mode security associations for a different untrusted access network,
determine that the security association pair that is associated with the untrusted access network is to be applied based upon the access selection unit detecting that the UE has attached or needs to attach to the untrusted access network, and
apply said security association pair when the access selection unit detects the attachment to or the need to attach to the untrusted access network, wherein the application is to include a transmission of an information exchange message to the security gateway that indicates that said established inactive pair of security associations is to be applied.

13. The mobile UE according to claim 12, further comprising a connection unit, coupled to the access selection unit and the security unit, and configured to:
trigger an establishment of the pair of tunnel mode security associations with the security gateway; and
instruct the security unit to change the status of the security association pair.

14. The mobile UE according to claim 12, wherein the security unit is further configured to set a flag in the key negotiation message or the information exchange message that defines the status of the pair of security associations.

15. The mobile UE according to claim 12, wherein the security unit is further configured to set the pair of security associations in an active status or the inactive status by configuring one or more security databases.

16. A method in a security gateway for exchanging data between a user equipment (UE) and a core network via the security gateway, the method comprising:
establishing an inactive pair of tunnel mode security associations between the security gateway and the UE, the establishment including receiving a key negotiation message from the UE, the key negotiation message indicating that the pair of security associations is to be in an inactive status; and
apply said established inactive pair of security associations to user traffic traversing an untrusted access network, the application including receiving an information exchange message from the UE, the information exchange message indicating that said established inactive pair of security associations is to be applied, the application further including updating an outer Internet Protocol (IP) address of said security association pair with an IP address allocated to the UE by the untrusted access network.

17. The method according to claim 16, further comprising:
deactivating the pair of security associations that is applied to the user traffic in said untrusted access network, the deactivation including receiving another information exchange message from the UE, the another information exchange message indicating that said applied pair of security associations is to be in the inactive status.

18. The method according to claim 16, further comprising sending a Proxy Binding Update (PBU) message to a Packet Data Network Gateway.

19. The method according to claim 16, wherein the pair of security associations are established over a trusted access network and kept in the inactive status while the UE remains attached to the trusted access network.

20. A security gateway for interconnecting access networks to a core network and comprising:
an interface configured to communicate with a user equipment (UE) over an untrusted access network and with the core network; and
a security unit configured to:
establish an inactive pair of tunnel mode security associations with the UE upon receipt of a key negotiation message from the UE, the key negotiation message indicating that the pair of security associations is to be in an inactive status, and
apply said security association pair upon receipt an information exchange message from the UE, the information exchange message indicating that said established inactive pair of security associations is to be applied, wherein the application is to include an updating of an outer Internet Protocol (IP) address of said security association pair with an IP address allocated to the UE by the untrusted access network.

21. A method in a User Equipment (UE) for exchanging data between the UE and a core network via a security gateway, the method comprising:
establishing an inactive pair of tunnel mode security associations between the UE and said security gateway, wherein said establishing includes a transmission to said security gateway of a key negotiation message indicating that the pair of security associations is to be in an inactive status;
detecting an attachment to or a need to attach to an untrusted access network; and
applying said established inactive pair of security associations to user traffic traversing the untrusted access network, wherein said applying includes a transmission of an information exchange message to said security gateway indicating that said established inactive pair of security associations is to be applied, and wherein said applying further includes updating an outer Internet Protocol (IP) address of said security association pair with an IP address allocated to the UE by the untrusted access network.

* * * * *

UNITED STATES PATENT AND TRADEMARK OFFICE
CERTIFICATE OF CORRECTION

| | | |
|---|---|---|
| PATENT NO. | : 8,732,816 B2 | Page 1 of 1 |
| APPLICATION NO. | : 13/502117 | |
| DATED | : May 20, 2014 | |
| INVENTOR(S) | : Sugimoto et al. | |

It is certified that error appears in the above-identified patent and that said Letters Patent is hereby corrected as shown below:

On the Title Page, in Item (56), under "FOREIGN PATENT DOCUMENTS", in Column 2, Line 1, delete "9/2004" and insert -- 3/2006 --, therefor.

IN THE SPECIFICATION:

In Column 8, Line 49, delete "(step 325 FIG. 3)." and insert -- (step 325 in FIG. 3). --, therefor.

In Column 10, Line 13, delete "(335 in FIG. 3)" and insert -- (step 335 in FIG. 3) --, therefor.

IN THE CLAIMS:

In Column 14, Line 67, in Claim 10, delete "to the in an" and insert -- to the --, therefor.

In Column 16, Line 31, in Claim 20, delete "receipt an" and insert -- receipt of an --, therefor.

Signed and Sealed this
Eighteenth Day of November, 2014

Michelle K. Lee
*Deputy Director of the United States Patent and Trademark Office*